(12) United States Patent
Yokokura (10) Patent No.: US 7,240,118 B2
(45) Date of Patent: Jul. 3, 2007

(54) NETWORK SYSTEM, NETWORK DEVICE, ACCESS RESTRICTION METHOD FOR NETWORK DEVICE, STORAGE MEDIUM, AND PROGRAM

(75) Inventor: Hidenori Yokokura, Tokyo (JP)

(73) Assignee: Canon Kabushiki Kaisha (JP)

( * ) Notice: Subject to any disclaimer, the term of this patent is extended or adjusted under 35 U.S.C. 154(b) by 770 days.

(21) Appl. No.: 09/867,470

(22) Filed: May 31, 2001

(65) Prior Publication Data

US 2001/0052018 A1  Dec. 13, 2001

(30) Foreign Application Priority Data

Jun. 12, 2000  (JP)  ............................. 2000-176128
May 11, 2001  (JP)  ............................. 2001-141774

(51) Int. Cl.
*G06F 15/16*  (2006.01)

(52) U.S. Cl. .......................................... 709/229; 707/9

(58) Field of Classification Search ............... 370/229; 709/229, 200, 225, 228, 202, 203, 217, 219; 713/156; 707/104, 203, 10; 715/513; 726/15; 718/105

See application file for complete search history.

(56) References Cited

U.S. PATENT DOCUMENTS

| | | | |
|---|---|---|---|
| 5,852,717 A * | 12/1998 | Bhide et al. ................. 709/203 |
| 6,028,838 A * | 2/2000 | Yamamura et al. .......... 370/229 |
| 6,029,175 A * | 2/2000 | Chow et al. .............. 707/104.1 |
| 6,138,141 A * | 10/2000 | DeSimone et al. .......... 709/203 |
| 6,157,930 A * | 12/2000 | Ballard et al. ............... 707/203 |
| 6,173,311 B1 * | 1/2001 | Hassett et al. ............... 709/202 |
| 6,182,142 B1 * | 1/2001 | Win et al. .................... 709/229 |
| 6,330,561 B1 * | 12/2001 | Cohen et al. ................... 707/10 |
| 6,353,855 B1 * | 3/2002 | Hendren, III ................ 709/228 |
| 6,415,313 B1 * | 7/2002 | Yamada et al. .............. 709/200 |
| 6,438,690 B1 * | 8/2002 | Patel et al. .................. 713/156 |
| 6,449,367 B2 * | 9/2002 | Van Wie et al. ............ 380/232 |
| 6,463,474 B1 * | 10/2002 | Fuh et al. .................... 709/225 |
| 6,594,697 B1 * | 7/2003 | Praitis et al. ................ 709/225 |
| 6,606,663 B1 * | 8/2003 | Liao et al. ................... 709/229 |
| 6,638,314 B1 * | 10/2003 | Meyerzon et al. ........... 715/513 |
| 6,640,307 B2 * | 10/2003 | Viets et al. .................... 726/15 |
| 6,678,733 B1 * | 1/2004 | Brown et al. ................ 709/229 |
| 7,025,209 B2 * | 4/2006 | Hawkins ...................... 209/217 |
| 7,155,723 B2 * | 12/2006 | Swildens et al. ............ 718/105 |

\* cited by examiner

*Primary Examiner*—Nathan J. Flynn
*Assistant Examiner*—Dustin Nguyen
(74) *Attorney, Agent, or Firm*—Fitzpatrick, Cella, Harper & Scinto (57) ABSTRACT

When access is attempted by a device equipped with Web client capabilities, a device connected to a network and equipped with Web server capabilities judges whether to restrict the access. If it is judged that the access should be restricted, information about the reason for the access restriction is sent regardless of the information possessed by the device equipped with Web client capabilities.

7 Claims, 5 Drawing Sheets

NETWORK SYSTEM, NETWORK DEVICE, ACCESS RESTRICTION METHOD FOR NETWORK DEVICE, STORAGE MEDIUM, AND PROGRAM

BACKGROUND OF THE INVENTION

1. Field of the Invention

The present invention relates to a network system, network device, access restriction method for the network device, storage medium, and program.

2. Related Background Art

Recent years have seen a rapid growth of an Internet that is run by means of networks connected with network devices such as computers and printers. Consequently, various applications have been developed that use the Internet. In the future, it is expected that such Internet applications will grow rapidly. In particular, network devices, such as printers connected to networks, are provided with Web server capabilities to allow a commercially available Web browser to access the network devices and refer to the status, print jobs, etc. of the network devices. The initial values or the like of such network devices are set by device managers. The device managers should take measures to restrict access to Web servers in order to prevent the settings to be overwritten by users during the maintenance of the network devices.

However, although it is possible to restrict access to a Web server and issue an error code such as "403 Forbidden" or the like when a user who is forbidden access to the Web server tries to access it, the amount of information contained in the error code is too small to explain to the user clearly why the access to the Web server was restricted. Also, although it is possible to notify the user of the restriction on access to the Web server by changing an HTML file dynamically, the user's Web server displays the HTML file stored in its cache regardless of the HTML file's update date specified by the user. Consequently, the amount of display data cannot be reduced even if the HTML file was undated after the update date.

SUMMARY OF THE INVENTION

An object of the present invention is to make it possible to clearly explain to users the reason for restrictions on access to network devices.

Another object of the present invention is to make it possible to reliably explain to the users the reason for the latest access restriction.

Another object of the present invention is to reduce the amount of display data sent to the users.

Other objects of the present invention will be apparent from the following detailed description taken in connection with the accompanying drawings.

DETAILED DESCRIPTION OF THE PREFERRED EMBODIMENTS

Now, the network system according to an embodiment of the present invention will be described below with reference to the drawings.

Figure 1:
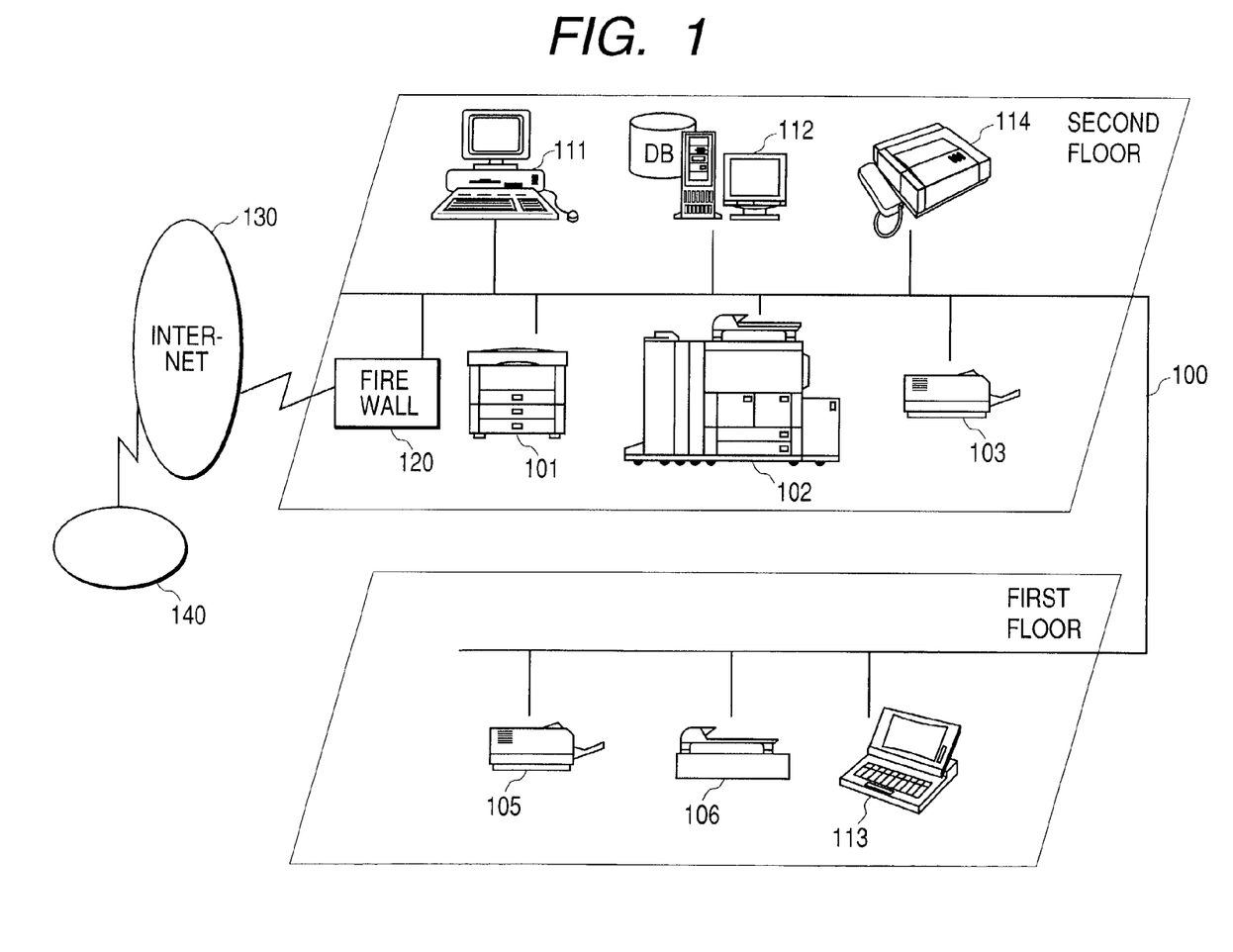
FIG. 1 is a block diagram of a network system according to an embodiment of the present invention.

FIG. 1 is a block diagram of a network system according to the embodiment of the present invention;

In FIG. 1, a LAN 100 (network) is connected with a plurality of network devices including a color printer 101, an MFP (multi function peripheral) 102 such as a copier that can be used as a network printer, a monochrome printer 103, a facsimile machine 114, and scanners 105 and 106 as well as with a plurality of computers including desktop PCs 111 and 112 and a notebook PC 113.

The color printer 101, MFP 102, the monochrome printer 103, the facsimile machine 104, and desktop PCs 111 and 112 are installed on the second floor of the building while the scanners 105 and 106 and notebook PC 113 are installed on the first floor of the building. The notebook PC 113, which is portable, can be disconnected from the LAN 100.

The desktop PCs 111 and 112 and notebook PC 113 are equipped with a Web browser to refer to the status, etc. of network devices equipped with Web server capabilities. These PCs are capable of HTTP-(Hypertext Transfer Protocol) based access to exchange HTML (Hypertext Markup Language) documents among the network devices.

At least one of the network devices described above is equipped with a Web server and at least one of the computers is equipped with a Web client.

Moreover, the network 100 is connected to the Internet 130 via a firewall 120 and further connected to another network 140 through the Internet 130.

Figure 2:
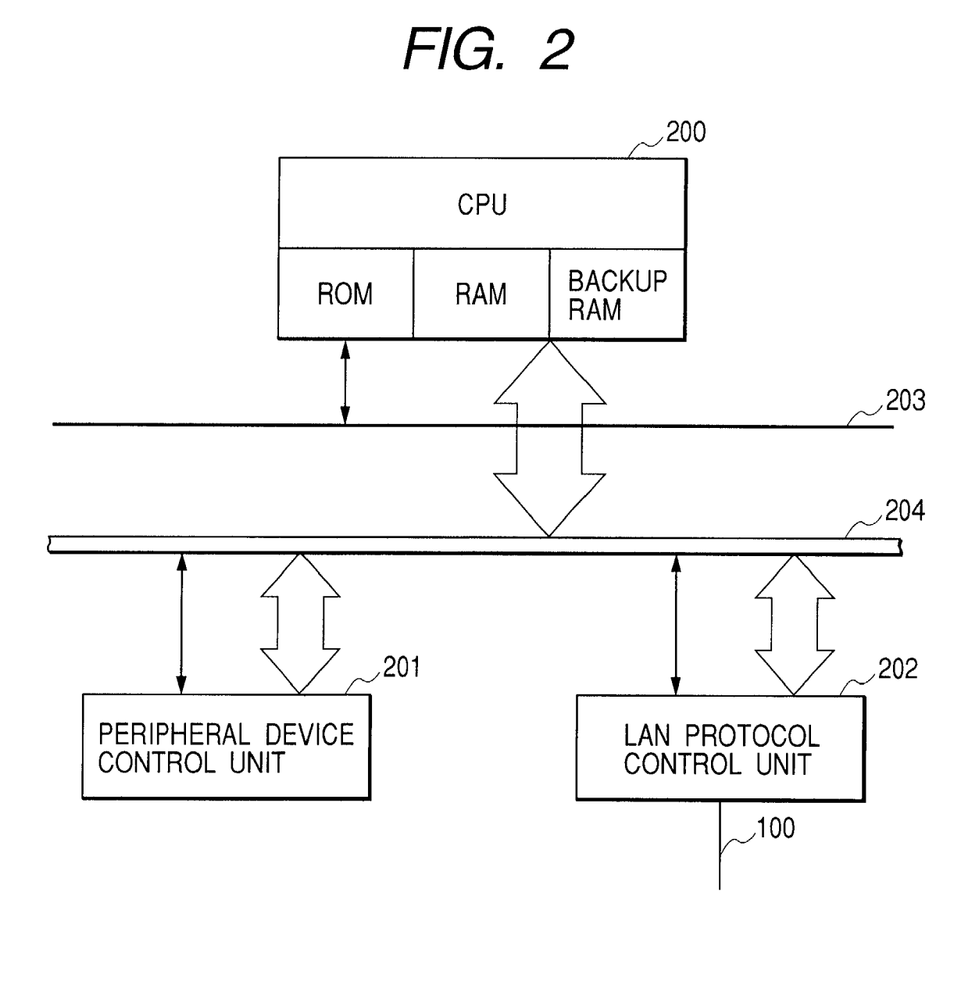
FIG. 2 shows an internal configuration of a network device in the network system of FIG. 1.

FIG. 2 is a block diagram showing the internal configuration of the network device in the network system of FIG. 1.

Referring to FIG. 2, the network device equipped with a Web server comprises a control unit 200, a peripheral device control unit 201, and a LAN protocol control unit 202, which are connected to a control bus 203 that totally controls the control units as well as to a data bus 204.

The data bus 204 is connected with peripheral devices such as a printer and facsimile machine. The control unit 200 consists of a CPU, ROM, RAM, backup RAM, etc. For example, according to a program stored in the ROM, the CPU judges whether a device is placed under maintenance, and decides to apply access restrictions if the device is under maintenance. The backup RAM stores a flag for the CPU to decide whether to apply access restrictions. The peripheral device control unit 201 sends and receives data to/from peripheral devices such as a printer and facsimile machine via the data bus 204.

The LAN protocol control unit 202 sends and receives data to/from other network devices or PCs via the LAN 100.

Figure 3:
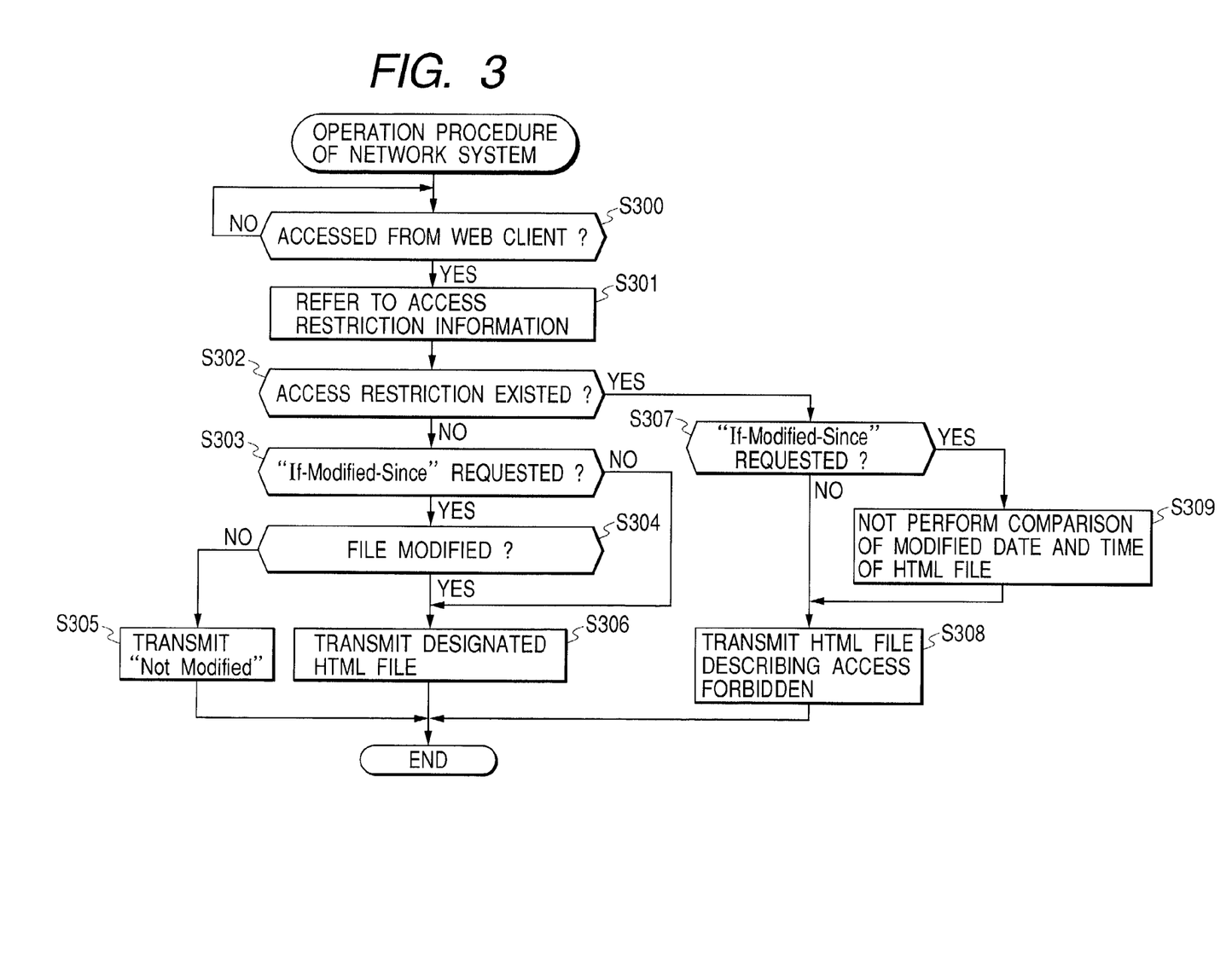
FIG. 3 is a flowchart showing an operation of the network system according to the embodiment of the present invention.

FIG. 3 is a flowchart showing the process of restricting access to a network device equipped with Web server capabilities, performed by the network system according to the embodiment of the present invention.

In FIG. 3, after a start-up of the network device equipped with Web server capabilities, if the Web client installed on a computer attempts to access the Web server (YES in Step S300), the Web server refers to the access restriction information stored in the storage means of the network device (Step S301) and judges whether an access restriction should be applied (Step S302). The access restriction information mentioned above is set by a device manager and used to decide whether to restrict access to the Web server on the network device.

If it is judged in Step S302 that Web server access is not restricted (access is permitted) according to the access restriction information, the Web server goes to Step S303 and judges whether there is an "If-Modified-Since" request from the Web client.

The "If-Modified-Since" request here means a date/time-stamped request from the Web client. If the HTML file of the Web server has not been modified since that date, "Not Modified" is returned indicating that the HTML file has not been modified. This helps reduce the network load associated with downloading. If the Web client has cached the file that corresponds to the URL specified by the user, it sends out the "If-Modified-Since" request.

If it is judged in Step S303 that there is an "If-Modified-Since" request from the Web client, the Web server goes to Step S304, where it compares the date/time information stamped on the "If-Modified-Since" request with the date/time stamp on the HTML file retained by the Web client to judge whether the HTML file retained by the Web server has been updated. If it is judged in Step S304 that the file has not been updated since the date/time advised by the Web client, the Web server sends "Not Modified" to the Web client, indicating that the HTML file has not been modified (Step S305). On the other hand, if the HTML file has been updated, the Web server sends, as the updated file, the HTML file (Step S306) that corresponds to FIG. 5A described later and finishes the processing.

Incidentally, in Step S306, the Web server sends the HTML file of the Top page specified by the device unless otherwise specified.

If it is judged in Step S303 that there is no "If-Modified-Since" request from the Web client, the Web server sends the HTML file (Step S306) that corresponds to FIG. 5A described later regardless of whether the HTML file has been updated, and finishes the processing.

If it is judged in Step S302 that Web server access is restricted, the Web server goes to Step S307, where it judges whether there is an "If-Modified-Since" request from the Web client. If it turns out that there is no "If-Modified-Since" request from the Web client, the Web server notifies the user of the access restriction (Step S308) by sending to the Web client the HTML file prepared in advance to display information about the restriction on access to Web server and the reason for the restriction as shown in FIG. 5B described later. Then the Web server finishes the processing.

On the other hand, if it is judged in Step S307 that there is an "If-Modified-Since" request from the Web client, the Web server performs the process of Step S308 described above and finishes the processing without judging whether the HTML file has been updated since the date/time of the HTML file retained by the Web client (Step S309).

Figure 4:
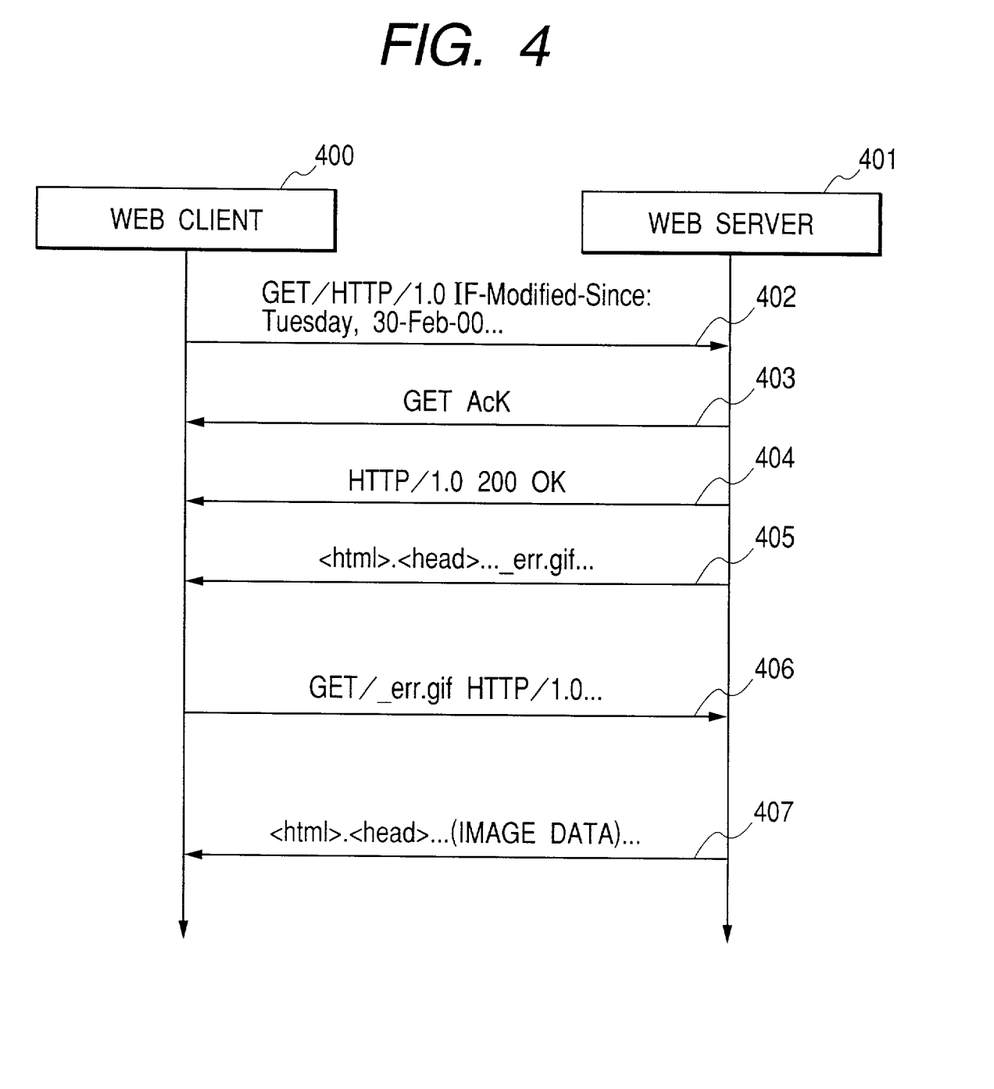
FIG. 4 is a drawing showing an example of HTTP sequence between a Web client and a Web server.

FIG. 4 is a drawing showing an example of HTTP sequence between a Web client and Web server. The following description will be associated with the description of FIG. 3 by appending the step numbers used in the flowchart of FIG. 3.

At least one of the network devices including the color printer 101, MFP (multi function peripheral) 102 such as a copier that can be used as a network printer, monochrome printer 103, facsimile machine 104 is equipped with a Web server 401. Also, at least one of the desktop PCs 111 and 112 and notebook PC 113 is equipped with a Web client 402.

When the Web browser on the desktop PC 111 or 112 or notebook PC 113 sends packets to a Web client 400, specifying the Web server 401 by its URL, if the Web client 400 retains the Top page information of the Web server 401, the Web client 400 starts making an inquiry as to whether access to the Web server 401 is restricted, by using "GET/HTTP1.0 If-Modified-Since:Tuesday, 30-Feb-00 . . . " as a data request (402) (Step S300 in FIG. 3).

Next, the Web server 401 returns "GET Ack" to inform (403) the Web client that the data has been acquired securely and returns status (404) (Step S301 in FIG. 3) in response to the data request (402). In this example, the Web server 401 first returns "HTTP/1.0 200 OK" indicating normal status, then using "<html>.<head> . . . _err.gif . . . " it returns the HTML file which shows that access to the Web server 401 is restricted (405) (Step S308 in FIG. 3). In this case, since the HTML file contains an image data file "err.gif," the Web client 400 requests the image data file "err.gif" by means of "GET/_err.gif HTTP/1.0 . . . " (406) and in response to the request, the Web server 401 returns to the Web client 400 the HTML file (407) that corresponds to FIG. 5B described later.

Figure 5A:
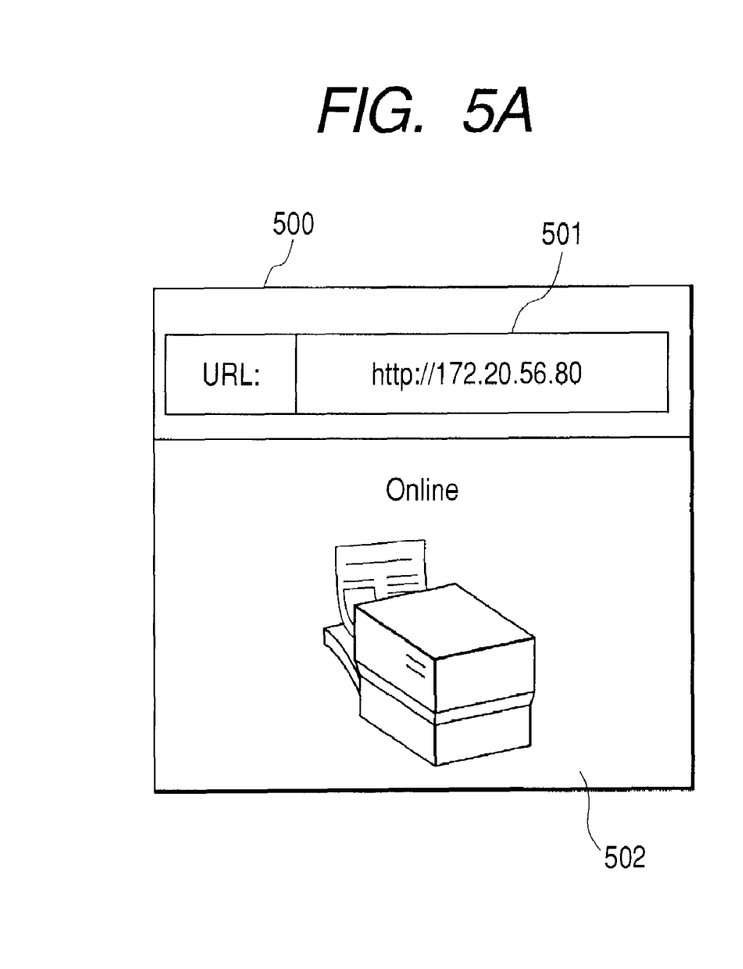
FIGS. 5A and 5B show examples of Web browser display, where 5A shows an example of a typical Web browser and 5B shows an example of a Web browser whose access to the Web server is restricted.
Figure 5B:
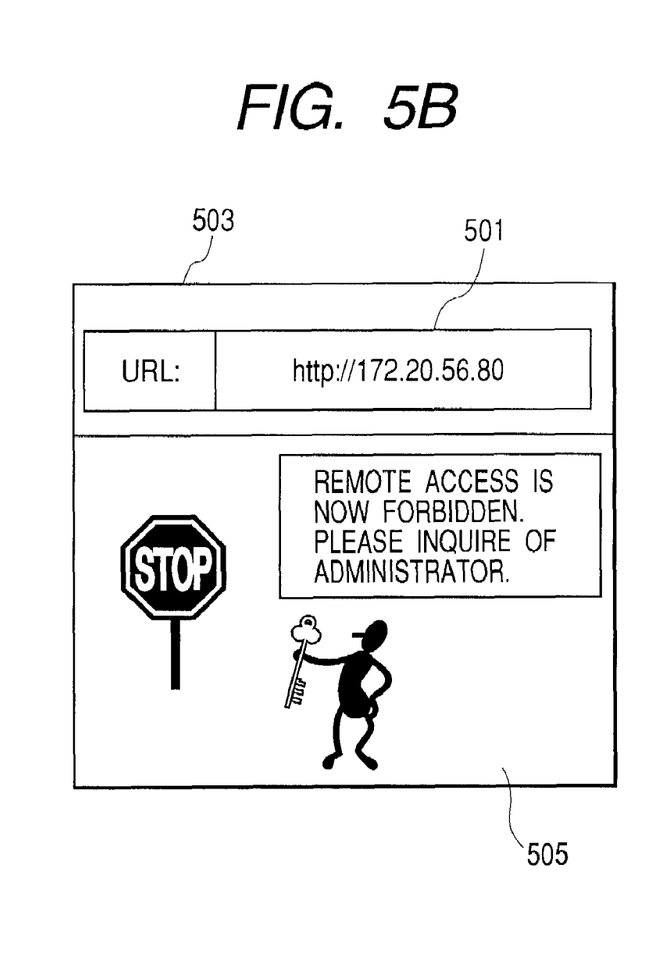

FIGS. 5A and 5B show display examples of Web browsers accessing a Web server.

In FIG. 5A, the Web browser 500 displays a typical Web browser's screen 502, which contains a URL 501 that identifies a network device by specifying its IP address. In this example, the screen displays an image and status of a printer. Incidentally, the Web browser 500 displays the Top page data retained by the Web server 401 unless a file name is specified.

On the other hand, in FIG. 5B, a Web browser 503 displays the screen 505 sent by the Web server 401 when access to the Web server 401 is restricted by the device manager. The image data and character data on the screen 505 makes it possible to notify the Web client 400 clearly that access to the Web server 401 is restricted.

Typical examples of the Web browsers 500 and 503 include Microsoft Corp.'s Internet Explorer, Netscape Communications Corp.'s Netscape Communicator, etc.

According to this embodiment, if it has been determined to restrict access to the Web server (YES in Step S302), an HTML file (FIG. 5B) that contains information about the restriction on access to the Web server and the reason for the restriction is sent to the Web client (Step S308). Therefore, the HTML file sent to the Web client can notify the user reliably of the restriction on access to the Web server and the reason for the restriction (e.g., maintenance). Besides, if it has been determined to restrict access to the Web server (YES in Step S302) and if the Web client has specified the update date of the data (YES in Step S307), the HTML file (FIG. 5B) that contains information about the restriction on access to the Web server and the reason for the restriction is sent to the Web client (Step S308) without comparing update dates/times of the HTML file (Step S309). This prevents the HTML file cached by the Web browser from being displayed and thus makes it possible to notify the latest reason or the like reliably. If access is not restricted, the amount of display data can be reduced because status information is provided according to the update date.

Although the above embodiment uses an HTML file to provide device information, it may also use a text file, image file, etc. Besides, although in the above embodiment, a Web server has been installed on a network device, it may also be installed on a computer and send device information to the Web client by playing the role of a proxy server.

Although a process of restricting access to the Web server has been described in relation to the above embodiment, this process may be written as a program into a storage medium and then be performed through execution of the program read out from the storage medium. Possible candidates for the storage medium include a floppy disk, hard disk, CD-ROM, MO, etc., but the storage medium is not limited to any specific type, and any type can be used as long as it can store the above-mentioned program.

As described above in detail, the present invention can clearly explain to users the reason for restrictions on access to network devices.

Also, it is possible to reliably explain to the users the reason for the latest access restriction.

Besides, it is possible to reduce the amount of display data sent to the users.

What is claimed is:

1. A network-connectable apparatus, comprising:
    a restricting device adapted to restrict access to the network-connectable apparatus by another apparatus in accordance with a status of the network-connectable apparatus;
    a detecting device adapted to detect whether a request from the other apparatus is a request for inquiry about update of a file;
    a discrimination device adapted to discriminate, based on detection by said detecting device, whether a file corresponding to a file cached by the other apparatus has been updated, wherein said discrimination device makes its discrimination in accordance with time information included in the request; and
    a sending device adapted, in the case where the access to the network-connectable apparatus by the other apparatus is not restricted by said restricting device, selectively to send information representing that the file corresponding to the file cached by the other apparatus has not been updated, to the other apparatus, or to send the updated file to the other apparatus, in accordance with the discrimination by said discrimination device, and,
    in the case where the access to the network-connectable apparatus by the other apparatus is restricted by said restricting device, to send information representing that the access is rejected to the other apparatus, regardless as to whether or not the file corresponding to the file cached by the other apparatus is updated, wherein the information representing the access-rejection is information for describing a screen image which indicates in the other apparatus the reason for the access restriction.

2. The network-connectable apparatus according to claim 1, wherein said restricting device restricts access by the other apparatus in accordance with whether the network-connectable apparatus is under maintenance.

3. A network-connectable apparatus, comprising:
    a restricting device adapted to restrict access by another apparatus in accordance with a status of the network connectable apparatus;
    a detection device adapted to detect time information related to a file possessed by the other apparatus;
    a discrimination device adapted to discriminate whether a file corresponding to a file cached by the other apparatus has been updated, in accordance with time information detected by said detection device; and
    a sending device adapted, in the case where the access to the network-connectable apparatus by the other apparatus is not restricted by said restricting device, selectively to send information representing that the file corresponding to the file cached by the other apparatus has not been updated, to the other apparatus, or to send the updated file to the other apparatus, in accordance with the discrimination by said discrimination device, and,
    in the case where the access to the network-connectable apparatus by the other apparatus is restricted by said restricting device, to send information representing that the access is rejected to the other apparatus, regardless as to whether or not the file corresponding to the file cached by the other apparatus is updated, wherein the information representing access-restriction is information for describing a screen image which indicates in the other apparatus the reason for the access restriction.

4. The network-connectable apparatus according to claim 3, wherein, in a case in which access-restriction is made, said sending device sends the information representing that the access is rejected to the other apparatus without performance of discrimination by said discrimination device.

5. The network-connectable apparatus according to claim 3, wherein said restricting device restricts access by the other apparatus in accordance with whether the network-connectable apparatus is under maintenance.

6. A control method for a network-connectable apparatus, comprising:
    a restriction step of restricting access to the network-connectable apparatus by another apparatus in accordance with a status of the network-connectable apparatus;
    a detecting step of detecting whether a request from the other apparatus is a request for inquiry about update of a file;
    a discrimination step of discriminating whether a file corresponding to a file cached by the other apparatus has been updated, in accordance with the detection in said detecting step, wherein said discrimination step makes its discrimination in accordance with time information included in the request; and
    a sending step of, in the case where the access to the network-connectable apparatus by the other apparatus is not restricted, selectively sending information representing that the file corresponding to the file cached by the other apparatus has not been updated, to the other apparatus, or sending the updated file to the other apparatus, in accordance with the discrimination in said discrimination step, and,
    in the case where the access to the network-connectable apparatus by the other apparatus is restricted, sending information representing that the access is rejected to the other apparatus, regardless as to whether or not the file corresponding to the file cached by the other apparatus is updated, wherein the information representing the access-restriction is information for describing a screen image which indicates in the other apparatus the reason for the access restriction.

7. A control method for a network-connectable apparatus, comprising:
    a restricting step of restricting access by another apparatus in accordance with a status of the network-connectable apparatus;
    a detection step of detecting time information related to a file possessed by the other apparatus;

a discrimination step of discriminating whether a file corresponding to a file cached by the other apparatus has been updated, in accordance with time information detected in said detection step; and a sending step of, in the case where the access to the network-connectable apparatus by the other apparatus is not restricted, selectively sending information representing that the file corresponding to the file cached by the other apparatus has not been updated, to the other apparatus, or sending the updated file to the other apparatus, in accordance with the discrimination in said discrimination step, and, in the case where the access to the network-connectable apparatus by the other apparatus is restricted, sending information representing that the access is rejected to the other apparatus, regardless as to whether or not the file corresponding to the file cached by the other apparatus is updated, wherein the information representing the access-rejection is information for describing a screen image which indicates in the other apparatus the reason for the access restriction.

* * * * *

UNITED STATES PATENT AND TRADEMARK OFFICE
CERTIFICATE OF CORRECTION

PATENT NO. : 7,240,118 B2
APPLICATION NO. : 09/867470
DATED : July 3, 2007
INVENTOR(S) : Hidenori Yokokura It is certified that error appears in the above-identified patent and that said Letters Patent is hereby corrected as shown below:

On the Title Page Item -73-, "Kaisha (JP)" should read --Kaisha (JP) Tokyo, Japan--.

COLUMN 2:

Line 13, "invention;" should read --invention.--.

Signed and Sealed this

Fifteenth Day of April, 2008

JON W. DUDAS
*Director of the United States Patent and Trademark Office*